United States Patent

[11] 3,548,875

[72] Inventor Carmen J. Lagarelli
 New Castle, Del.
[21] Appl. No. 811,408
[22] Filed Mar. 28, 1969
[45] Patented Dec. 22, 1970
[73] Assignee Speakman Company
 Wilmington, Del.
 a corporation of Delaware

[54] VALVE CARTRIDGE
 13 Claims, 4 Drawing Figs.
[52] U.S. Cl. .................................................. 137/625.17,
 137/625.41, 137/454.2; 251/214, 251/262
[51] Int. Cl. ...................................................... F16k 11/00
[50] Field of Search ............................................ 137/454.2,
 625.17, 625.41, 636.4; 251/214, 262

[56] References Cited
 UNITED STATES PATENTS
 2,845,948 8/1958 Parker .................... 137/625.41X
 3,387,631 6/1968 Pecis ....................... 137/625.17

Primary Examiner—Harold W. Weakley
Attorney—Connolly and Hutz

ABSTRACT: Valve cartridge comprises valve casing with rotatable and reciprocal valve element inside casing and valve stem extending from casing. At least one inlet port in casing communicates with valve element. Improvements comprise sealing assembly at inlet port in casing and lower stem seal. Inlet sealing assembly includes washer that bears against valve element and resilient clip that retains washer against valve element. Lower stem seal includes bushing arranged to snugly receive lower end of valve stem and retainer attached to valve casing for supporting bushing relative to casing.

PATENTED DEC 22 1970  3,548,875

VALVE CARTRIDGE

BACKGROUND OF THE INVENTION

The present invention relates to a valve cartridge, and more particularly to improved seals at the inlet ports and the lower stem area of the cartridge.

Prior to the present invention numerous valve cartridge designs have been proposed for use in plumbing fixtures of the type that include single operator handles. As is well known, manipulation of the operator handle of such a fixture controls the rate of flow of the discharge fluid as well as the temperature of that fluid. Usually, the valve cartridge includes a valve casing with a pair of diametrically opposed inlet ports therein, one for hot water and the other for cold. These ports open into the interior of the valve cartridge casing where a rotatable and reciprocal mixing valve element is located. The valve element is connected to the operator handle and includes perforate and imperforate portions. Depending upon the position of the valve element with respect to the inlet ports various flow and temperature conditions may be obtained. When the imperforate portion of the valve element blocks one of the inlet ports fluid flow into the valve cartridge only occurs at the unblocked port. Likewise, when both ports are blocked no flow occurs.

It is important that the inlet ports in the valve casing of the cartridge be properly sealed to prevent leakage. Although O-rings have been utilized to seal the inlet ports, assembly procedures require special handling of these O-rings especially when the valve cartridge is inserted into the tight fitting valve housing or body of the fixture being assembled. Often, the O-rings surrounding the inlet ports are dislodged, nicked or cut during assembly of the fixture. Such damage or misalignment destroys the required seal at the inlet ports.

The lower stem area of the valve cartridge must also be properly sealed for efficient and maintenance free operation of a single operator fixture. As is well known, the lower stem area of a mixing valve is extremely important from the standpoint of producing a balanced valve under all flow conditions. Without a sealed lower stem the cross section of the stem would present a surface area against which fluid pressure acts to produce a force imbalance which tends to drive the valve element in an upward direction. However, by providing a seal for the lower stem of the valve element the upwardly and downwardly facing surface areas exposed to the fluid pressure are equal and the forces generated by the pressure acting on these surfaces balance out. Thus, it is necessary to effectively seal the lower stem of the valve element to prevent fluid pressure from acting upon the lower end of the valve stem. In the past, O-rings have been utilized to seal the lower stem of the valve element but these sealing arrangements are associated with structure integral or otherwise attached to the tight fitting valve housing or body into which the valve cartridge is inserted during assembly of the fixture. With such heretofore available arrangements, when the valve cartridge is removed for maintenance or replacement the lower stem sealing construction remains behind with the valve housing or body. In many instances, malfunction of the fixture is caused by a defective or worn out lower stem seal. Accordingly, when the removed valve cartridge is replaced malfunction of the fixture continues due to the defective lower stem seal. Costly replacement of the valve housing or body is then required which in many instances is not feasible because of mechanical ties between the valve housing and the remainder of the fixture.

Accordingly, it is an object of the present invention to provide a valve cartridge with a unique arrangement for sealing the inlet ports in the cartridge casing in a highly beneficial and economical manner.

Another object of the present invention is to provide an inlet sealing assembly which is easily and effectively attached to a valve cartridge casing at the inlet port area of the casing.

Still another object of the present invention is to provide a lower stem seal that effectively seals the lower stem of the rotatable and reciprocal valve element of a valve cartridge.

Another object of the present invention is to provide a lower stem seal which remains with the valve cartridge when the cartridge is removed for maintenance or replacement.

SUMMARY OF THE INVENTION

In accordance with the present invention, a valve cartridge is provided comprising a valve casing with a rotatable and reciprocal valve element inside the casing and a valve stem extending therefrom. At least one inlet port is located in the casing communicating with the valve element. A sealing assembly at the inlet port includes a washer bearing against the valve element and a resilient clip releasably secured to the exterior of the casing for retaining the washer against the valve element. A lower stem seal includes a bushing constructed and arranged to receive the lower end of the valve stem and a retainer attached to the valve casing for supporting the bushing in fixed spaced relationship away from the casing.

The sealing assembly at the inlet port in the casing may include a washer of composite construction including an antifriction member contacting the valve element inside the casing and a resilient backer member secured to the antifriction member. Moreover, the resilient clip of the inlet sealing assembly may have a pair of outwardly extending arms that radiate away from the inlet port in opposite directions with an inwardly extending projection at the end of each arm. Cutouts in the exterior of the valve casing are constructed and arranged to receive the outwardly extending arms and inwardly extending projections of the resilient clip to releasably secure the clip to the casing.

The lower stem seal for the valve stem may be constructed and arranged so that the retainer portion is snap-fitted onto the valve casing. Additionally, the retainer of the lower stem seal has openings which communicate with the interior of the valve casing.

BRIEF DESCRIPTION OF THE DRAWING

Novel features and advantages of the present invention in addition to those mentioned above will become apparent to those skilled in the art from a reading of the following detailed description in conjunction with the accompanying drawing wherein.

DETAILED DESCRIPTION OF THE INVENTION

Figure 1:
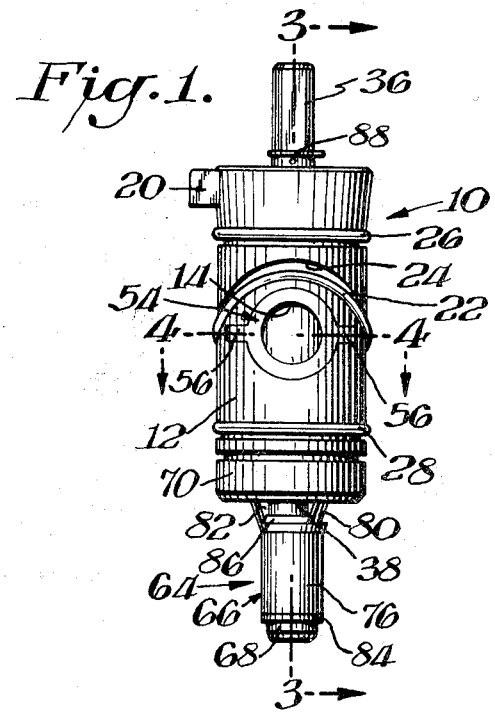
FIG. 1 is a front elevational view of a valve cartridge according to the present invention.

Referring in more particularity to the drawing, the present invention comprises a valve cartridge 10 for use in plumbing fixtures of the type having a single operator in the form of a lever or other handle structure. As explained more fully below, manipulation of the operator controls the flow rate and temperature of the fluid discharge from the fixture in which the valve cartridge 10 is incorporated. The valve cartridge includes a valve casing 12 molded as a single unit by techniques known in the art, such as injection molding, for example. The valve cartridge casing may be fabricated from numerous materials including polyformaldehydes, and more particularly, Delrin. Minor machining steps may also be carried out in the production of the casing. A pair of diametrically opposed inlet ports 14, 16 are molded in the valve casing 12. Each port empties into the interior of the valve casing where the incoming fluid is proportioned in response to manipulation of the valve operator.

The valve cartridge 10 cooperates with a tight fitting valve housing or body 18 into which the cartridge is inserted. The housing 18 may be fabricated from metal or thermoplastic material and includes surface waterways for channeling or otherwise directing incoming hot and cold water to the inlet ports 14, 16 in the valve casing 12. The valve housing 18 also includes additional surface waterways for channeling the discharge water away from the cartridge. As shown best in FIG. 1 and 2, the valve casing has a lateral projection 20 at the upper end thereof which fits into a slot (not shown) in the valve housing 18 when the cartridge is inserted into the housing. Thus, when the cartridge is fitted into the housing the hot and cold surface waterways therein are automatically aligned with the hot and cold inlet ports in the valve casing 12. As is well known, the hot and cold surface waterways of the valve housing are connected to suitable sources of hot and cold water.

Figure 2:
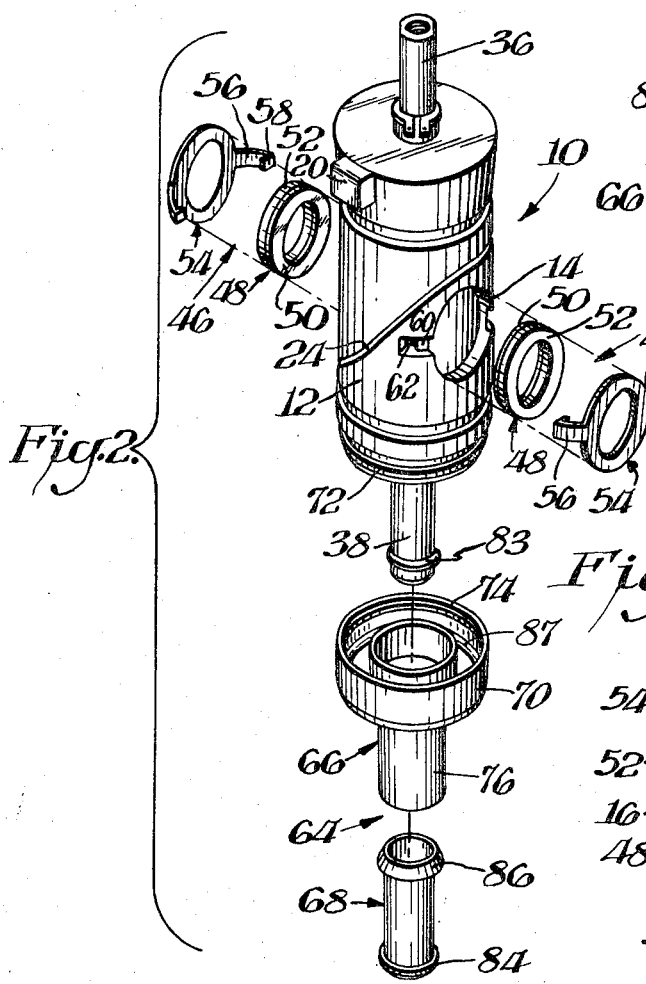
FIG. 2 is an exploded perspective view of the valve cartridge shown in FIG. 1.

A diagonal O-ring 22 is positioned within a diagonal groove 24 on the exterior of the valve casing 12, as shown best in FIGS. 1 and 2. Upper and lower O-rings 26, 28 are also positioned on the exterior of the valve casing 12 above and below the inlet ports 14, 16. The diagonal O-ring 22 and the upper and lower O-rings 26, 28 function to effectively seal the hot inlet port 14 from the cold inlet port 16. Additionally, O-rings 26, 28 prevent water leakage from between the valve housing 18 and the exterior of the valve casing 12.

A rotatable and reciprocal mixing valve element 30 located inside the valve casing 12 includes a cylinder 32 and a hollow valve stem 34 with upper and lower portions 36, 38, respectively. The valve element 30 rotates and reciprocates in response to rotatable and reciprocal movement of the operator (not shown) which is conveniently connected to the exposed uppermost end of the valve stem. The cylinder 32 has perforate and imperforate portions 40, 42, respectively. The openings 44 in the perforate portion of a cylinder 32 are arranged in predetermined manner so as to obtain a variety of discharge rates and mixtures of hot and cold water. Under flow conditions the openings 44 in the perforate portion of the cylinder 32 are in alignment with the hot and cold inlet ports 14, 16 in the valve casing 12. When the valve element 30 is positioned at the lower extent of its downward motion the hot and cold ports 14, 16 are closed by the imperforate upper portion 42 of the cylinder 32. However, when the mixing valve element 30 is positioned upwardly relative to the valve casing 12 the openings 44 in the perforate portion 40 of the cylinder communicate with the inlet ports 14, 16. Rotation of the cylinder through manipulation of the operator provides various combinations of hot and cold water including all hot and all cold. This is accomplished by aligning selected openings 44 in the cylinder with the hot and cold inlet ports 14, 16. Moreover, the discharge rate of water flowing through the fixture in which the valve cartridge 10 is incorporated is regulated by the elevation of the cylinder 32 relative to the inlet ports 14, 16. In this regard, the discharge rate increases to a maximum as the cylinder 32 moves to the maximum extent of its upward travel inside the casing.

Figure 4:
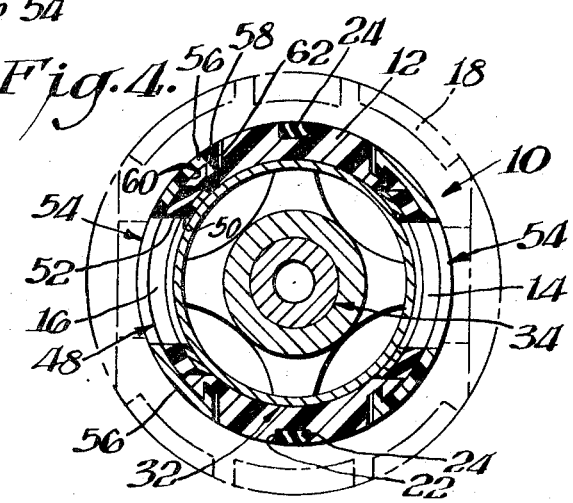
FIG. 4 is a sectional view taken along line 4—4 of FIG. 1.

Each of the inlet ports 14, 16 in the valve casing 12 is effectively sealed by an inlet sealing assembly 46. This assembly functions to prevent water leakage between the interior surface of the valve casing 12 and the exterior surface of the cylinder 32. Each inlet sealing assembly 46 comprises a composite washer 48 including an antifriction member 50 contacting the exterior surface of the cylinder 32 and a resilient backer member 52 bonded or otherwise secured to the antifriction member. The backer member may be fabricated of rubber or similar rubberlike material, and the antifriction member may be made of Teflon or other well-known lubricating resins. Each composite washer 48 is maintained in position at one of the inlet port areas of the valve casing 12 by a resilient clip 54 which fits over the composite washer 48, as shown best in FIG. 4. The clip has a pair of diametrically opposed outwardly extending arms 56 and the end of each arm is bent inwardly to form a projection 58. The composite washer 48 and the main body portion of the resilient clip 54 have approximately the same internal and external diameters, and the external diameter is approximately equal to that of the inlet ports in the casing 12.

Each of the inlet areas in the valve casing 12 includes a pair of opposed recessed portions or cutouts 60 for receiving the arms 56 of the resilient clip 54. The valve casing also has an inwardly projecting cutout 62 at the end of each recessed portion 60, as shown best in FIG. 4. The cutouts 62 accommodate the inward projections 58 at the ends of the arms 56 to anchor the resilient clip 54 to valve casing 12.

Assembly of the inlet seals is quite simple. After the mixing valve element 30 is positioned inside the valve casing 12 the composite washers 48 are inserted into the inlet ports 14, 16 so that the antifriction member 50 of each washer is positioned against the exterior surface of the cylinder 32. Each composite washer is maintained in position by one of the resilient clips 54 which is simply snapped into place on the exterior of the valve casing. The arms 56 and the projections 58 fit into the similarly dimensioned cutouts 60, 62 in the valve casing 12 to hold the clips in place and thereby maintain the washers in sealing relationship with the cylinder 32.

Figure 3:
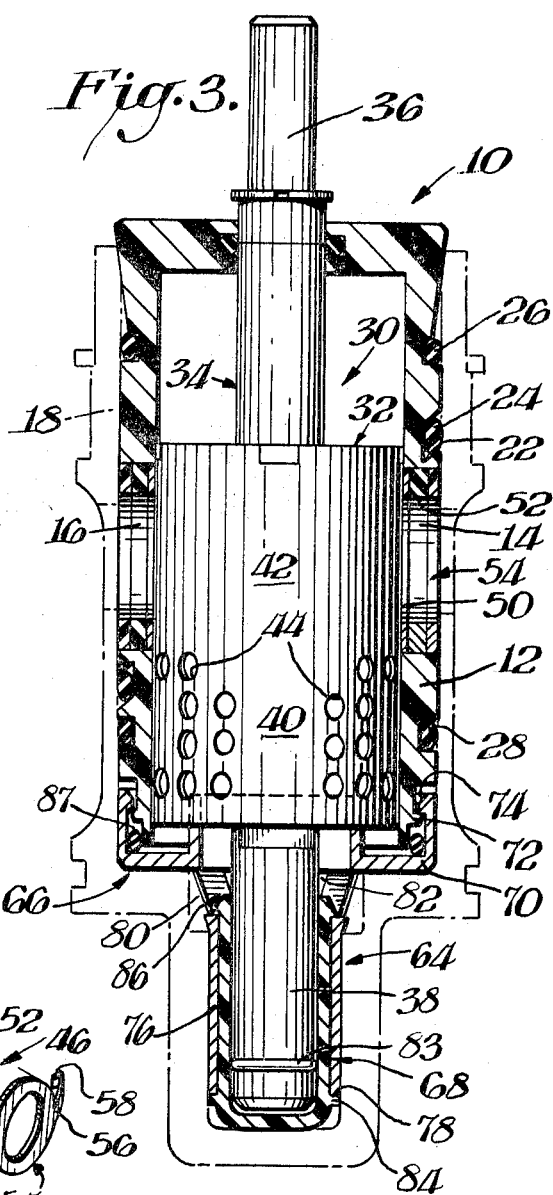
FIG. 3 is a sectional view taken along line 3—3 of FIG. 1.

As explained above, the lower end portion 38 of the valve stem 34 must be sealed to maintain the valve balanced under all flow conditions, particularly under full flow when the fluid pressure is maximum. The lower stem seal 64 of the present invention comprises a retainer 66 and a bushing 68 fabricated from any suitable antifriction material such as Teflon, for example. The retainer may be molded and/or machined from metal or thermoplastic material. For the most part, the retainer comprises an annular collar 70 which snaps onto the lower end of the cartridge casing 12 by purposely providing a force fitting relationship between an annular bead 72 on the casing and an inward annular projection 74 on the retainer 66. The retainer 66 also includes a cylindrical lower portion 76 with an open lower end 78. A frustoconical intermediate portion 80 functions to integrally connect the annular collar 70 to the cylindrical lower portion 76. The frustoconical intermediate portion of the retainer is interrupted by trapezoidal-shaped openings 82 through which water is discharged from the cartridge 10 under flow conditions. The Teflon bushing 68 surrounds the lower portion 38 of the valve stem 34 and snugly engages an O-ring 83 on the stem. Upward movement of the bushing with the valve stem as the cylinder 32 reciprocates is prevented by an annular flange 84 on the bushing which abuts the cylindrical lower portion 76 of the retainer at the open end 78 of the cylinder, as best shown in FIG. 3. Downward movement of the bushing relative to the valve element 30 is prevented by an upper annular flange 86 on the bushing which abuts the cylindrical portion 76 of the retainer, as also best shown in FIG. 3. Movement of the bushing in a downward direction is further prevented by engagement of the bushing with the valve housing 18, assuming of course that the housing is designed to abut the lower closed end of the bushing when the cartridge is fitted into the housing. The interior space in the bushing 68 directly below the lower stem portion 38 is vented via a longitudinal passageway in the stem and the vent hole 88 to facilitate the reciprocal movement of the valve stem inside the bushing.

The lower stem seal 64 operates to maintain balanced conditions under all flow rates. Additionally, since the lower stem seal is connected to the valve casing 12 removal of the valve cartridge 10 from within the valve housing 18 necessarily removes the lower stem seal. Replacement and/or repair of the valve cartridge 10 is easily accomplished and attention may be directed to the lower stem seal without removing the housing 18.

I claim:

1. In a valve cartridge comprising a valve casing with a rotatable and reciprocal valve element inside the casing and a valve stem extending therefrom, and at least one inlet port in the casing communicating with the valve element, the improvement comprising a sealing assembly at the inlet port in the casing including a washer bearing against the valve element and a resilient clip releasably secured to the exterior of the casing for retaining the washer against the valve element, and a lower stem seal for the valve stem including a bushing constructed and arranged to receive the lower end of the valve stem and a retainer attached to the valve casing for supporting the bushing in fixed spaced relationship away from the casing.

2. The combination of claim 1 in which the washer of the inlet sealing assembly has a composite construction including an antifriction member contacting the valve element inside the casing and a resilient backer member secured to the antifriction member.

3. The combination of claim 1 in which the resilient clip includes a pair of outwardly extending arms that radiate away from the inlet port in opposite directions and an inwardly extending projection at the end of each arm, and cutouts in the exterior of the valve casing constructed and arranged to receive the outwardly extending arms and inwardly extending projections of the resilient clip to releasably secure the clip to the casing.

4. The combination of claim 3 in which the washer of the inlet sealing assembly has a composite construction including an antifriction member contacting the valve element inside the casing and a resilient backer member secured to the antifriction member.

5. The combination of claim 1 in which the retainer of the lower stem seal is snap-fitted onto the valve casing.

6. The combination of claim 5 in which the retainer of the lower stem seal has openings communicating with the interior of the valve casing.

7. In a valve cartridge comprising a valve casing with a rotatable and reciprocal valve element inside the casing and a valve stem extending therefrom, and at least one inlet port in the casing communicating with the valve element, the improvement comprising a sealing assembly at the inlet port in the casing including a washer bearing against the valve element and a resilient clip releasably secured to the exterior of the casing for retaining the washer against the valve element.

8. The combination of claim 7 in which the washer of the inlet sealing assembly has a composite construction including an antifriction member contacting the valve element inside the casing and a resilient backer member secured to the antifriction member.

9. The combination of claim 7 in which the resilient clip includes a pair of outwardly extending arms that radiate away from the inlet port in opposite directions and an inwardly extending projection at the end of each arm, and cutouts in the exterior of the valve casing constructed and arranged to receive the outwardly extending arms and inwardly extending projections of the resilient clip to releasably secure the clip to the casing.

10. The combination of claim 9 in which the washer of the inlet sealing assembly has a composite construction including an antifriction member contacting the valve element inside the casing and a resilient backer member secured to the antifriction member.

11. In a valve cartridge comprising a valve casing with a rotatable and reciprocal valve element inside the casing and a valve stem extending therefrom, the improvement comprising a lower stem seal for the valve stem including a bushing constructed and arranged to receive the lower end of the valve stem and a retainer attached to the valve stem for supporting the bushing in fixed spaced relationship away from the casing.

12. The combination of claim 11 in which the retainer of the lower stem seal is snap-fitted onto the valve casing.

13. The combination of claim 12 in which the retainer of the lower stem seal has openings communicating with the interior of the valve casing.